US007174135B2

(12) United States Patent
Sluijter et al.

(10) Patent No.: US 7,174,135 B2
(45) Date of Patent: Feb. 6, 2007

(54) WIDEBAND SIGNAL TRANSMISSION SYSTEM

(75) Inventors: Robert Johannes Sluijter, Eindhoven (NL); Andreas Johannes Gerrits, Eindhoven (NL); Samir Chennoukh, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 287 days.

(21) Appl. No.: 10/480,660

(22) PCT Filed: Jun. 20, 2002

(86) PCT No.: PCT/IB02/02366

§ 371 (c)(1),
(2), (4) Date: Dec. 12, 2003

(87) PCT Pub. No.: WO03/003350

PCT Pub. Date: Jan. 9, 2003

(65) Prior Publication Data

US 2004/0166820 A1 Aug. 26, 2004

(30) Foreign Application Priority Data

Jun. 28, 2001 (EP) ................................ 01202504

(51) Int. Cl.
*H04B 1/00* (2006.01)
*H04B 7/00* (2006.01)
*G10L 19/00* (2006.01)

(52) U.S. Cl. ........................ 455/72; 455/142; 704/500

(58) Field of Classification Search .................. 455/39, 455/72, 142; 704/500, 219, 205–206, 230, 704/503
See application file for complete search history.

(56) References Cited

U.S. PATENT DOCUMENTS 5,710,863 A * 1/1998 Chen ....................... 704/200.1
6,889,182 B2 * 5/2005 Gustafsson ................. 704/205
6,895,375 B2 * 5/2005 Malah et al. ............... 704/219
6,931,373 B1 * 8/2005 Bhaskar et al. ............. 704/230

FOREIGN PATENT DOCUMENTS

WO WO0135395 5/2001

OTHER PUBLICATIONS

"Speech Enhancement Based on Temporal Processing" by Hynek Hermansky et al.; Proceedings of the 1995 IEEE International conference on Acoustics, Speech, and Signal Processing, pp. 405-408.

* cited by examiner

*Primary Examiner*—Nguyen T. Vo

(57) ABSTRACT

Described is a transmission system (10) comprising a transmitter (12) for transmitting a narrowband audio signal to a receiver (14) via a transmission channel (16). The receiver (14) comprises a frequency domain bandwidth extender (18) for extending a bandwidth of the received narrowband audio signal by complementing the received narrowband audio signal with a highband extension thereof. The bandwidth extender (18) comprises an amplitude extender (24) for extending the bandwidth of an amplitude spectrum of the received narrowband audio signal by mapping narrowband amplitudes onto highband amplitudes. The bandwidth extender (18) further comprises a phase extender (26) for extending the bandwidth of a phase spectrum of the received narrowband signal and a combiner (28) for combining the extended amplitude spectrum and the extended phase spectrum into a bandwidth extended audio signal. The transmission system (10) is characterized in that the amplitude extender (24) comprises an amplitude mapper (42) and first and second frequency scale transformers (40,44). The first frequency scale transformer. (40) is arranged for transforming a linear frequency scale of the amplitude spectrum into a logarithmic frequency scale, e.g. the Bark scale. The amplitude mapper (42) is arranged for mapping according to the logarithmic frequency scale the narrowband amplitudes onto the highband amplitudes. The second frequency scale transformer (44) is arranged for transforming the logarithmic frequency scale of the extended amplitude spectrum into the linear frequency scale.

20 Claims, 4 Drawing Sheets

WIDEBAND SIGNAL TRANSMISSION SYSTEM

Figure 1:
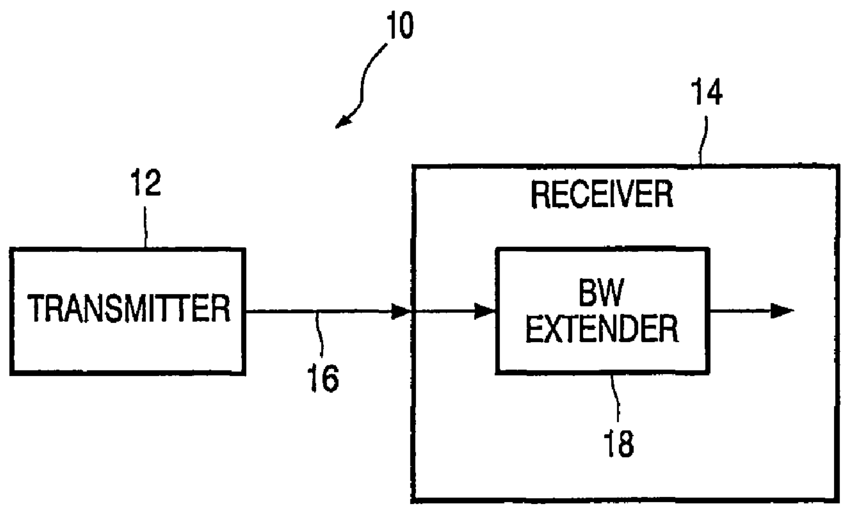

The invention relates to transmission system comprising a transmitter for transmitting a narrowband audio signal to a receiver via a transmission channel, the receiver comprising a frequency domain bandwidth extender for extending a bandwidth of the received narrowband audio signal by complementing the received narrowband audio signal with a highband extension thereof, the bandwidth extender comprising an amplitude extender for extending the bandwidth of an amplitude spectrum of the received narrowband audio signal by mapping narrowband amplitudes onto highband amplitudes, the bandwidth extender further comprising a phase extender for extending the bandwidth of a phase spectrum of the received narrowband signal and a combiner for combining the extended amplitude spectrum and the extended phase spectrum into a bandwidth extended audio signal.

The invention further relates to a receiver for receiving, via a transmission channel, a narrowband audio signal from a transmitter and to a method of receiving, via a transmission channel, a narrowband audio signal.

A transmission system according to the preamble is known from the paper "Speech Enhancement Based on Temporal Processing" by Hynek Hermansky et. al. in the proceedings of the 1995 IEEE International Conference on Acoustics, Speech, and Signal Processing, pp. 405–408.

Such transmission systems may for example be used for transmission of audio signals, e.g. speech signals or music signals, via a transmission medium such as a radio channel, a coaxial cable or an optical fibre. Such transmission systems can also be used for recording of such audio signals on a recording medium such as a magnetic tape or disc. Possible applications are automatic answering machines, dictating machines, (mobile) telephones or MP3 players.

Narrowband speech, which is used in the existing telephone networks, has a bandwidth of 3100 Hz (300–3400 Hz). Speech sounds more natural if the bandwidth is increased to around 7 kHz (50–7000 Hz). Speech with this bandwidth is called wideband speech and has an additional low band (50–300 Hz) and high band (3400–7000 Hz). From the narrowband speech signal, it is possible to generate a high band and a low band by extrapolation. The resulting speech signal is called a pseudo-wideband speech signal. Several techniques for extending the bandwidth of narrowband signal are known, for example from the paper "A new technique for wideband enhancement of coded narrowband speech", IEEE Speech Coding Workshop 1999, Jun. 20–23, 1999, Porvoo, Finland. These techniques are used to improve the speech quality in a narrowband network, such as a telephone network, without changing the network. At the receiving side (e.g. a mobile phone or a telephone answering machine) the narrowband speech can be extended to pseudo-wideband speech.

The receiver of the known transmission system comprises a frequency domain bandwidth extender for extending the bandwidth of a received narrowband speech signal. This bandwidth extender comprises a FFT of length 128 for transforming the received time domain narrowband speech signal into a frequency domain narrowband speech signal. Next, the amplitude spectrum and the phase spectrum of this frequency domain signal are bandwidth extended separately and the resulting wideband amplitude spectrum and wideband phase spectrum are thereafter combined into a frequency domain wideband speech signal. The bandwidth extension of the amplitude spectrum is performed by mapping a 128-point narrowband amplitude spectrum onto a 128-point highband amplitude spectrum.

The extension of the bandwidth of the amplitude spectrum of the received narrowband signal in the known transmission system is relatively complex as it requires a relatively large number of computations to be performed and as it requires a relatively large memory for storing (intermediate) data.

It is an object of the invention to provide a transmission system as described in the opening paragraph which is relatively simple in that it requires less computations and a smaller memory. This object is achieved in the transmission system according to the invention, which transmission system is characterized in that the amplitude extender comprises an amplitude mapper and first and second frequency scale transformers, the first frequency scale transformer being arranged for transforming a linear frequency scale of the amplitude spectrum into a logarithmic frequency scale, the amplitude mapper being arranged for mapping according to the logarithmic frequency scale the narrowband amplitudes onto the highband amplitudes, the second frequency scale transformer being arranged for transforming the logarithmic frequency scale of the extended amplitude spectrum into the linear frequency scale. By transforming a linear frequency scale (which is divided in relatively fine units of equal size) of the amplitude spectrum into a logarithmic frequency scale (which is divided in relatively course units of increasing size) the amplitude spectrum comprises much less data than the original linear frequency scale amplitude spectrum so that the mapping of the narrowband amplitudes onto the highband amplitudes requires less computations and less memory. Preferably the logarithmic frequency scale is chosen to be the so-called Bark scale. Alternatively, the ERB logarithmic frequency scale may be used.

Figure 5:
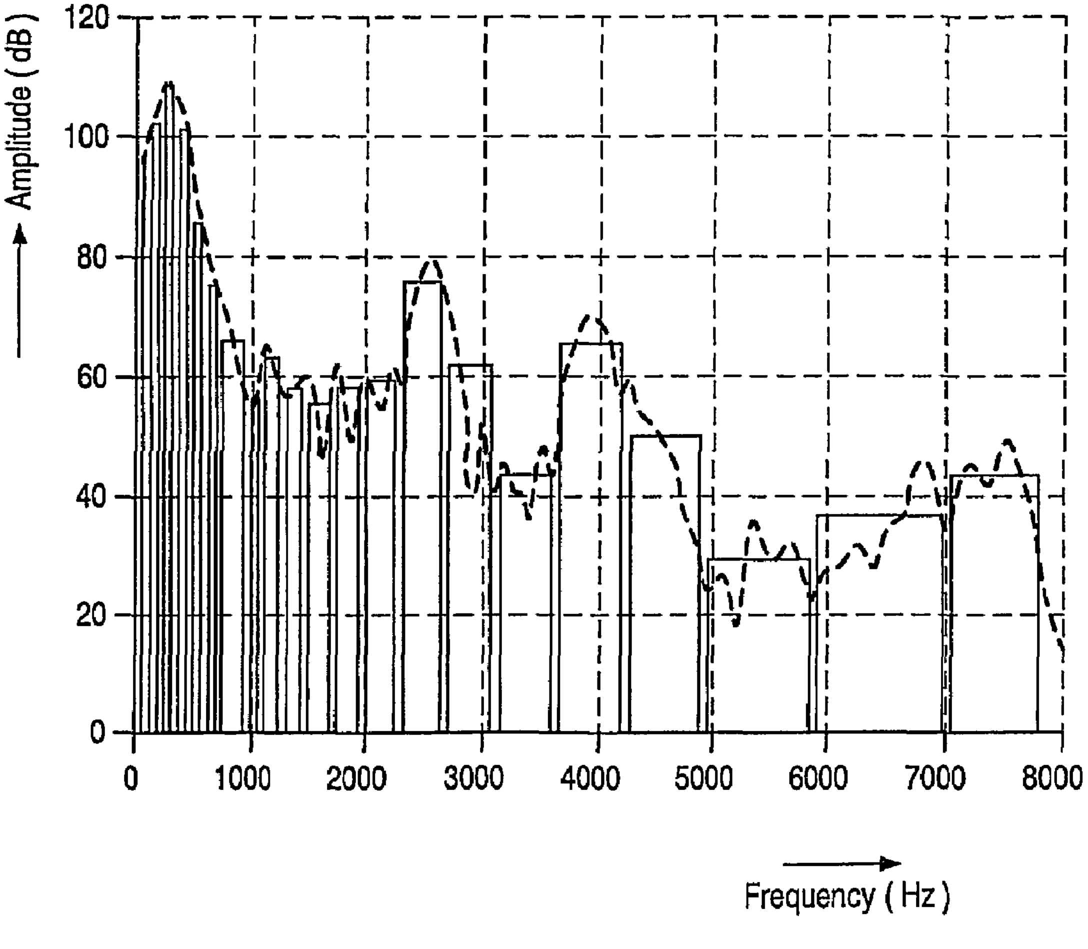

FIG. 5 shows an example of a Bark scale spectrum and a linear frequency scale spectrum of a wideband speech signal. The dotted line represents the linear frequency scale spectrum and the solid lines represent frequency bins according to the Bark scale. Each frequency in a bin has the same amplitude (i.e. the mean of all amplitudes frequency scale spectrum). When applying the Bark scale the narrowband part of the speech signal (i.e. below 4000 Hz) can be represented by only 18 amplitudes, while the highband part of the speech signal (i.e. above 4000 Hz) can be represented by 4 amplitudes. In stead of mapping a 128-point narrowband amplitude spectrum onto a 128-point highband amplitude spectrum (as done in the known transmission system) it now suffices to map 18 narrowband amplitudes onto 4 highband amplitudes which is clearly much more computationally efficient and requires less memory. It has also been found that, as a relatively large number of narrowband amplitudes is mapped on a relatively small number of highband amplitudes, the calculated highband amplitudes are very accurate.

An embodiment of the transmission system according to the invention is characterized in that the amplitude mapper further comprises a matrix selector for selecting a mapping matrix from a plurality of mapping matrices and a matrix multiplier for obtaining the highband amplitudes by multiplying the narrowband amplitudes with the selected mapping matrix. The use of mapping matrices has proven to be an efficient way for mapping the narrowband amplitudes onto the highband amplitudes. The mapping matrices that are used for extending the amplitude spectrum require only a small amount of Data ROM (Read Only Memory). In the example described in the previous paragraph, the matrices are 18 by 4. A commonly used approach for extension is the use of codebooks, which, for a comparable performance, consumes more Data ROM. Also the computational complexity of such a codebook approach is higher, since the entries of the codebook have to be searched for the best match. In International Patent Application WO 01/35395 (PCT/EP00/10761, PHF99607) the use of mapping matrices for the purpose of wideband speech synthesis is described in more detail.

Another embodiment of the transmission system according to the invention is characterized in that the amplitude mapper further comprises normalization means for normalizing the narrowband amplitudes and scaling means for scaling the highband amplitudes according to the volume of the received narrowband signal. In this way, the actual mapping operation is performed on normalized narrowband amplitudes which do not depend on the actual volume of the narrowband speech signal. After the mapping operation has been performed the original volume information is incorporated again by scaling the highband amplitudes.

A further embodiment of the transmission system according to the invention is characterized in that the amplitude mapper further comprises smoothing means for smoothing the highband amplitudes. Preferably current highband amplitudes are smoothed with the highband amplitudes of previous frames so that sudden changes in amplitudes are avoided.

Figure 3:
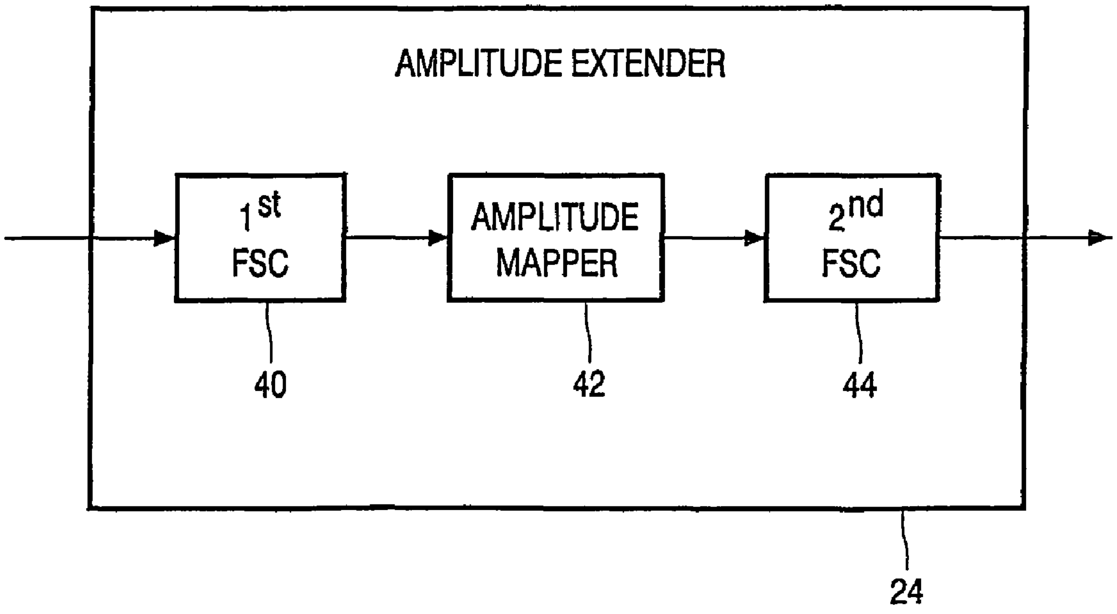
Figure 2:
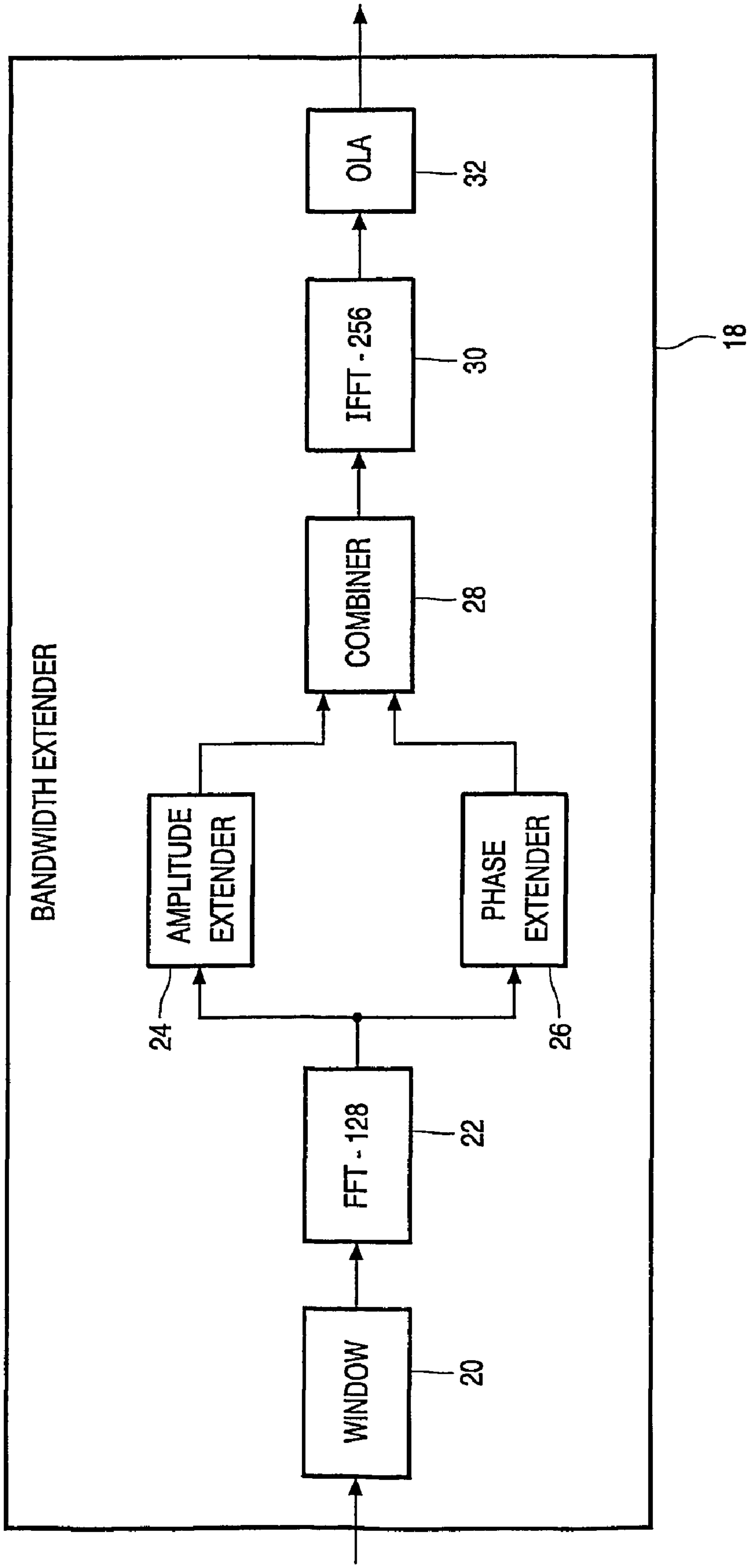
Figure 4:
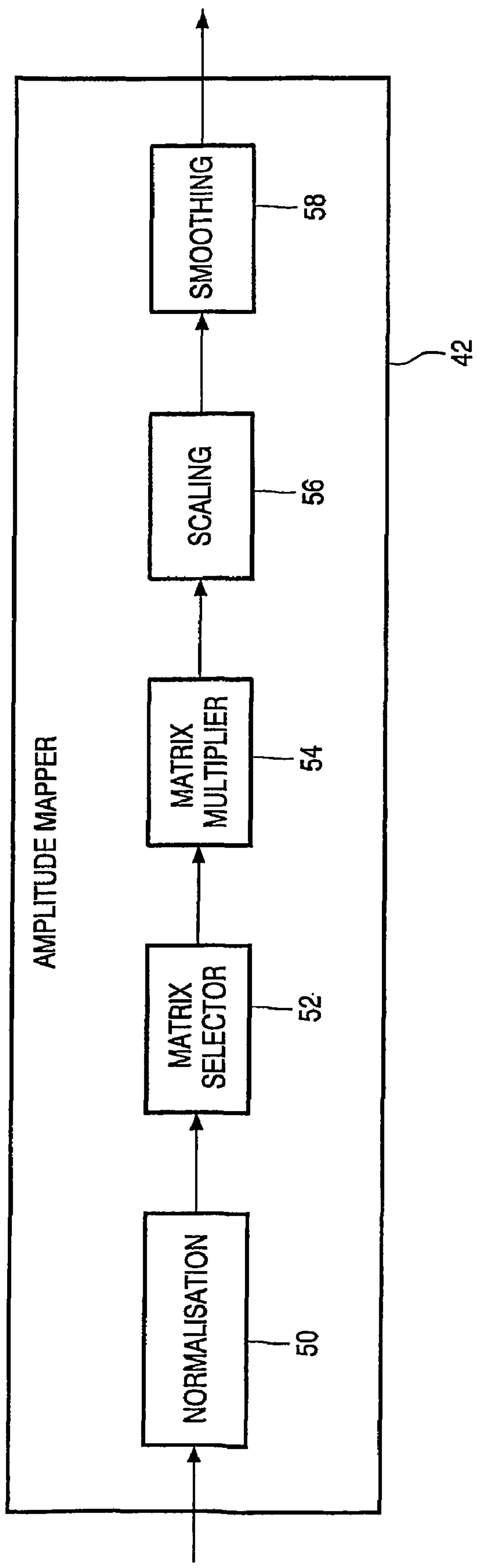

The above object and features of the present invention will be more apparent from the following description of the preferred embodiments with reference to the drawings, wherein:

FIG. 1 shows a block diagram of an embodiment of the transmission system 10 according to the invention, FIG. 2 shows a block diagram of an embodiment of a bandwidth extender 18 for use in the transmission system 10 according to the invention, FIG. 3 shows a block diagram of an embodiment of an amplitude extender 24 for use in the transmission system 10 according to the invention, FIG. 4 shows a block diagram of an embodiment of an amplitude mapper 42 for use in the transmission system 10 according to the invention, FIG. 5 shows an example of a Bark scale spectrum and a linear frequency scale spectrum of a wideband speech signal and will be used to explain the operation of the transmission system according to the invention.

In the Figures, identical parts are provided with the same reference numbers.

FIG. 1 shows a block diagram of an embodiment of the transmission system 10 according to the invention. The transmission system 10 comprises a transmitter 12 for transmitting a narrowband audio signal, e.g. a narrowband speech signal or a narrowband music signal, to a receiver 14 via a transmission channel 16. The transmission system 10 may be a telephone communication system wherein the transmitter may be a (mobile) telephone and wherein the receiver may be a (mobile) telephone or an answering machine. The receiver 14 comprises a frequency domain bandwidth extender 18 for extending a bandwidth of the received narrowband audio signal by complementing the received narrowband audio signal with a highband extension thereof.

FIG. 2 shows a block diagram of an embodiment of a bandwidth extender 18 for use in the transmission system 10 according to the invention. The received narrowband audio signal is first segmented in frames of 10 ms (or 80 samples at a sampling frequency of 8000 Hz), such that each frame has an overlap of 5 ms with its adjacent frames. Next, each frame is windowed using a Hanning window 20. An FFT 22 (Fast Fourier Transform) of length 128 is thereafter applied on the windowed signal, resulting in a complex spectrum S of length 128. This complex spectrum S is transformed to its amplitude spectrum |S| and phase spectrum $\phi$ as follows:

$$|S| = \sqrt{S_r^2 + S_i^2} \text{ and } \tag{1}$$

$$\varphi = \arctan\frac{S_i}{S_r}, \tag{2}$$

where $S_r$ represents the real part of S and $S_i$ represents the imaginary part. Both the amplitude spectrum |S| and phase spectrum $\phi$ are modified in order to achieve bandwidth extension.

The bandwidth extender 18 comprises an amplitude extender 24 for extending the bandwidth of the amplitude spectrum |S| of the received narrowband audio signal by mapping narrowband amplitudes onto highband amplitudes. The bandwidth extender 18 further comprises a phase extender 26 for extending the bandwidth of the phase spectrum $\phi$ of the received narrowband signal and a combiner 28 for combining the extended amplitude spectrum $|S_e|$ and the extended phase spectrum $\phi_e$ into a bandwidth extended audio signal. The amplitude spectrum $|S_e|$ and phase spectrum $\phi_e$ are converted to spectrum $S_e$ by:

$$S_e = |S_e| \cdot e^{j\phi_e} \tag{3}$$

The time signal $S_e$ is obtained by applying an inverse FFT 30 of length 256 on $S_e$ and taking the first 160 samples. This corresponds to 10 ms, since the sampling frequency is 16 kHz. An Overlap-Add (OLA) procedure 32 with 5 ms overlap with the previous and next frame is applied. Since the frames are already windowed with a Hanning window, no additional windowing is required.

The phase spectrum $\phi_e$ may be extended by upsampling the narrowband spectrum. As a result, the phase spectrum between 4 and 8 kHz is a mirrored version of the phase spectrum in the band from 0 to 4 kHz. An easy implementation of this procedure is possible by merging a mirrored and negated version of the 128 points phase spectrum with the original phase spectrum to obtain a 256-point pseudo-wideband spectrum, which is denoted by $\phi_e$. Additionally, in case of non-voiced speech, a random sequence may be added to the high-band phase spectrum before mirroring. For this purpose, a voiced/non-voiced-detector may be useful.

FIG. 3 shows a block diagram of an embodiment of an amplitude extender 24 for use in the transmission system 10 according to the invention. The amplitude extender 24 comprises an amplitude mapper 42 and first and second frequency scale transformers 40 and 44. The first frequency scale transformer 40 is arranged for transforming a linear frequency scale of the amplitude spectrum into a logarithmic frequency scale. The amplitude mapper 42 is arranged for mapping, according to the logarithmic frequency scale, the narrowband amplitudes onto the highband amplitudes; The second frequency scale transformer 44 is arranged for transforming the logarithmic frequency scale of the extended amplitude spectrum into the linear frequency scale.

The amplitude spectrum |S| is linear in frequency and amplitude. On both scales, a non-uniform transformation is applied. The linear frequency scale is transformed in the first frequency scale transformer 40 to the critical bandwidths belonging to the so-called Bark scale, which Bark scale is a logarithm scale having critical bandwidths. For a frequency f the corresponding critical bandwidth w is given by:

$$w=25+75\cdot(1+1.4\cdot10^{-6}f^2)^{0.69} \tag{4}$$

The amplitude spectrum |S| is sampled for one frequency of each critical band. There are 18 sampling points in the frequency band below 4 kHz, whereas 4 points are present in the high band. The amplitudes of the sampled spectrum $|S_w|$ are then converted to the log-domain by:

$$A_n=20\log_{10}|S_w| \tag{5}$$

The extension of the amplitudes (i.e. the mapping, according to the Bark frequency scale, of the narrowband amplitudes onto the highband amplitudes) in the amplitude mapper 42 is performed using mapping matrices. The use of multiple mapping matrices is described in International Patent Application WO 01/35395 (PCT/EP00/10761, PHF99607), where is applied on LPC parameters. In this method, the extension is performed on the 18 narrowband amplitudes $A_n$ and will result in 4 high band amplitudes $A_h$.

The high band amplitudes are then converted from the logarithmic Bark scale to the linear frequency scale in the second frequency scale transformer 44. This can be done in two ways. One way is to hold the amplitude of the complete critical band constant. It is also possible to make a polynomial fit on the amplitude points (i.e. a so-called spline fit). This method, which is more complex, results in a better speech quality. Also, the amplitudes are transformed to the linear domain. By merging this high band amplitude spectrum and the narrowband amplitude spectrum, a pseudo-wideband amplitude spectrum $|S_e|$ of length 256 is obtained.

FIG. 4 shows a block diagram of an embodiment of an amplitude mapper 42 for use in the transmission system 10 according to the invention. As stated before, the mapping or extension is performed on the 18 narrowband amplitudes $A_n$ and will result in 4 high band amplitudes $A_h$. This is done according to the following steps: first, in normalization means 50 the narrowband amplitudes are normalized by removing the mean from the narrowband amplitudes:

$$A=A_n-\overline{A_n} \tag{6}$$

Next, in a matrix selector 52 a mapping matrix is selected from a plurality of mapping matrices on basis of the narrowband amplitude spectrum |S|. For example, the plurality of mapping matrices may comprise 10 matrices: 5 for voiced speech and 5 for non-voiced speech. A voiced/non-voiced detector may be used to compare the energy in the frequency band from 0 to 1 kHz with the energy in the band from 0 to 4 kHz. If the energy difference is above a certain threshold, the frame can be classified as voiced, otherwise it is non-voiced. In order to select one of the 5 (voiced or non-voiced) matrices, the difference in energy between the band from 0 to 1 kHz and the band from 1 to 2 kHz may be used. The matrices and the thresholds to select the matrices can be obtained by training.

The normalized narrowband amplitudes A are thereafter multiplied with the selected mapping matrix in a matrix multiplier 54 in order to obtain the high band amplitudes A':

$$A'=M\cdot A, \tag{7}$$

where M is a mapping matrix of 18 by 4:

$$M=\begin{pmatrix} m[1,1] & m[1,2] & \ldots & m[1,18] \\ m[2,1] & m[2,2] & \ldots & m[2,18] \\ m[3,1] & m[3,2] & \ldots & m[3,18] \\ m[4,1] & m[4,2] & \ldots & m[4,18] \end{pmatrix} \tag{8}$$

Next, the calculated high band amplitudes are scaled to the proper level (i.e. according to the volume of the received narrowband signal) by means of a scaling means 56. This scaling is done by adding the mean of the narrowband amplitudes:

$$A_h=A'+\overline{A_n} \tag{9}$$

Finally, the extended band amplitudes are smoothed by interpolating the current amplitudes $A_h$ with the amplitudes from the previous frames.

The number of matrices that are used for the mapping of the narrowband amplitudes onto the highband amplitudes may be changed. Experiments have shown that it is possible to lower the number of matrices to 4 (in stead of 10 as described above) while still obtaining an acceptable speech quality. The bandwidth extender 18 may be implemented by means of digital hardware or by means of software which is executed by a digital signal processor or by a general purpose microprocessor.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A transmission system comprising a transmitter for transmitting a narrowband audio signal to a receiver via a transmission channel, the receiver comprising a frequency domain bandwidth extender for extending a bandwidth of the received narrowband audio signal by complementing the received narrowband audio signal with a highband extension thereof, the bandwidth extender, comprising an amplitude extender for extending the bandwidth of an amplitude spectrum of the received narrowband audio signal by mapping narrowband amplitudes onto highband amplitudes, the bandwidth extender further comprising a phase extender for extending the bandwidth of a phase spectrum of the received narrowband signal and a combiner for combining the extended amplitude spectrum and the extended phase spectrum into a bandwidth extended audio signal, wherein the amplitude extender comprises an amplitude mapper and first and second frequency scale transformers, the first frequency scale transformer being arranged for transforming a linear frequency scale of the amplitude spectrum into a logarithmic frequency scale, the amplitude mapper being arranged for mapping according to the logarithmic frequency scale the narrowband amplitudes onto the highband amplitudes, the second frequency scale transformer being arranged for transforming the logarithmic frequency scale of the extended amplitude spectrum into the linear frequency scale.

2. The transmission system according to claim 1, wherein the logarithmic frequency scale is the Bark scale.

3. The system of claim 2, wherein the amplitude mapper further comprises a matrix selector for selecting a mapping matrix from a plurality of mapping matrices and a matrix multiplier for obtaining the highband amplitudes by multiplying the narrowband amplitudes with the selected mapping matrix.

4. The system of claim 3, wherein amplitude mapper further comprises smoothing means for smoothing the highband amplitudes.

5. The system of claim 3, wherein the amplitude mapper further comprises normalization means for normalizing the narrowband amplitudes and scaling means for scaling the highband amplitudes according to the volume of the received narrowband signal.

6. The system of claim 5, wherein amplitude mapper further comprises smoothing means for smoothing the highband amplitudes.

7. The system of claim 2, wherein the amplitude mapper further comprises normalization means for normalizing the narrowband amplitudes and scaling means for scaling the highband amplitudes according to the volume of the received narrowband signal.

8. The system of claim 7, wherein amplitude mapper further comprises smoothing means for smoothing the highband amplitudes.

9. The transmission system according to claim 1, wherein the amplitude mapper further comprises a matrix selector for selecting a mapping matrix from a plurality of mapping matrices and a matrix multiplier for obtaining the highband amplitudes by multiplying the narrowband amplitudes with the selected mapping matrix.

10. The system of claim 9, wherein the amplitude mapper further comprises normalization means for normalizing the narrowband amplitudes and scaling means for scaling the highband amplitudes according to the volume of the received narrowband signal.

11. The system of claim 10, wherein amplitude mapper further comprises smoothing means for smoothing the highband amplitudes.

12. The system of claim 9, wherein amplitude mapper further comprises smoothing means for smoothing the highband amplitudes.

13. The transmission system according to claim 1, wherein the amplitude mapper further comprises normalization means for normalizing the narrowband amplitudes and scaling means for scaling the highband amplitudes according to the volume of the received narrowband signal.

14. The transmission system according to claim 1, wherein the amplitude mapper further comprises smoothing means (58) for smoothing the highband amplitudes.

15. A receiver for receiving, via a transmission channel, a narrowband audio signal from a transmitter, the receiver comprising a frequency domain bandwidth extender for extending a bandwidth of the received narrowband audio signal by complementing the received narrowband audio signal with a highband extension thereof, the bandwidth extender comprising an amplitude extender for extending the bandwidth of an amplitude spectrum of the received narrowband audio signal by mapping narrowband amplitudes onto highband amplitudes, the bandwidth extender further comprising a phase extender for extending the bandwidth of a phase spectrum of the received narrowband signal and a combiner for combining the extended amplitude spectrum and the extended phase spectrum into a bandwidth extended audio signal, wherein the amplitude extender comprises an amplitude mapper and first and second frequency scale transformers, the first frequency scale transformer being arranged for transforming a linear frequency scale of the amplitude spectrum into a logarithmic frequency scale, the amplitude mapper being arranged for mapping according to the logarithmic frequency scale the narrowband amplitudes onto the highband amplitudes, the second frequency scale transformer being arranged for transforming the logarithmic frequency scale of the extended amplitude spectrum into the linear frequency scale.

16. The receiver according to claim 15, wherein the logarithmic frequency scale is the Bark scale.

17. The receiver according to claim 15, characterized in that the amplitude mapper further comprises a matrix selector for selecting a mapping matrix from a plurality of mapping matrices and a matrix multiplier for obtaining the highband amplitudes by multiplying the narrowband amplitudes with the selected mapping matrix.

18. A method of receiving, via a transmission channel , a narrowband audio signal, the method comprising:

extending the bandwidth of an amplitude spectrum of the received narrowband audio signal by mapping narrowband amplitudes onto highband amplitudes, extending the bandwidth of a phase spectrum of the received narrowband signal, combining the extended amplitude spectrum and the extended phase spectrum into a bandwidth extended audio signal, characterized in that the method further comprises:

transforming a linear frequency scale of the amplitude spectrum into a logarithmic frequency scale, mapping according to the logarithmic frequency scale the narrowband amplitudes onto the highband amplitudes, transforming the logarithmic frequency scale of the extended amplitude spectrum into the linear frequency scale.

19. The method of claim 18, wherein the logarithmic frequency scale is the Bark scale.

20. The method claim 18, further comprising:

selecting a mapping matrix from a plurality of mapping matrices, and obtaining the highband amplitudes by multiplying the narrowband amplitudes with the selected mapping matrix.

* * * * *